US005495365A

United States Patent [19]

Morooka

[11] Patent Number: 5,495,365

[45] Date of Patent: Feb. 27, 1996

[54] FINDER OPTICAL SYSTEM

[75] Inventor: Masaru Morooka, Hachiouji, Japan

[73] Assignee: Olympus Optical Co., Ltd., Tokyo, Japan

[21] Appl. No.: 77,940

[22] Filed: Jun. 18, 1993

[51] Int. Cl.$^6$ .......... G02B 23/00; G03B 13/10

[52] U.S. Cl. .......... 359/432; 359/422; 359/691; 354/222; 354/224

[58] Field of Search .......... 359/422–424, 359/431, 432, 821, 643, 434–435, 691; 354/94, 199, 219–225

[56] References Cited

U.S. PATENT DOCUMENTS

| | | | |
|---|---|---|---|
| 4,131,354 | 12/1978 | Hagiwara | 359/421 |
| 5,144,349 | 9/1992 | Kato et al. | 354/222 |
| 5,227,824 | 7/1993 | Yoshida et al. | 354/195.12 |
| 5,255,030 | 10/1993 | Mukai et al. | 354/94 |
| 5,257,055 | 10/1993 | Cho et al. | 354/222 |

FOREIGN PATENT DOCUMENTS

| | | | |
|---|---|---|---|
| 202512 | 12/1982 | Japan | 359/643 |
| 132211 | 8/1983 | Japan | 359/643 |

OTHER PUBLICATIONS

Hideyuki Abe, "Making Of Picture Of Panoramic Photograph", Photographic Industries, Shashin Kogyo Publishing Co., Ltd. vol. 49, No. 2, Feb. 1991.

*Primary Examiner*—Thong Q. Nguyen
*Attorney, Agent, or Firm*—Cushman, Darby & Cushman

[57] ABSTRACT

A finder optical system includes an objective system having a positive refracting power, a reflecting member having a field frame of variable shape, for erecting an image, and an eyepiece system having a positive refracting power. At least one positive lens unit of the eyepiece system is moved along the optical axis, and at least one positive tens unit is inserted in the optical path of the eyepiece system. The magnification of the finder optical system can thus be increased.

6 Claims, 12 Drawing Sheets

FIG. 1 PRIOR ART
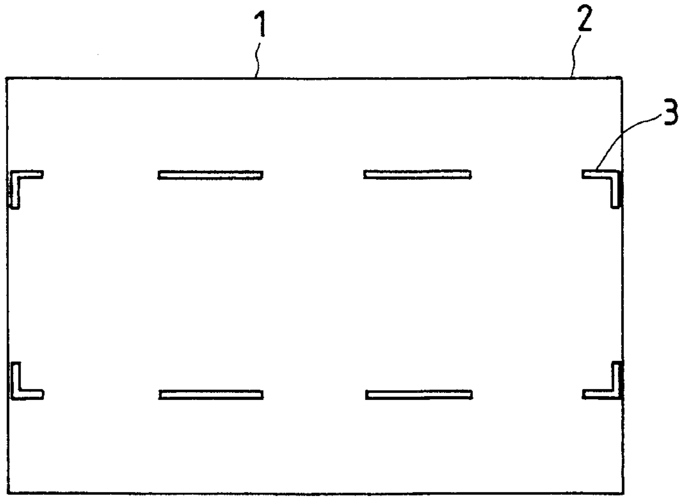
FIG. 2A
FIG. 2B
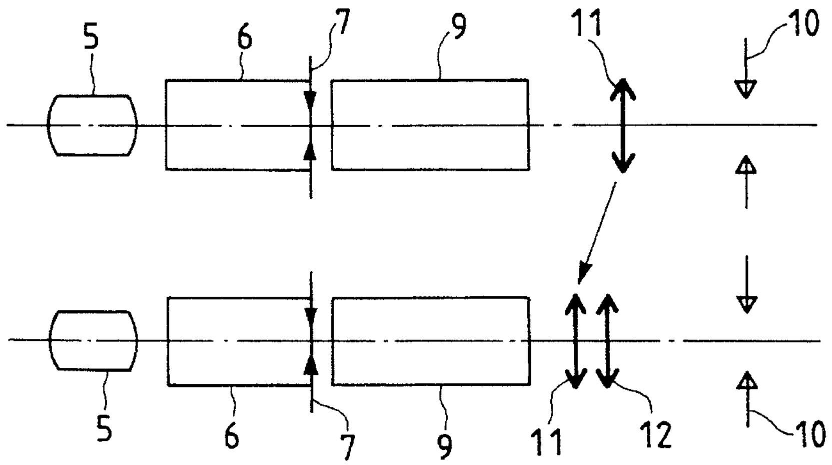

FIG. 3A
FIG. 3B
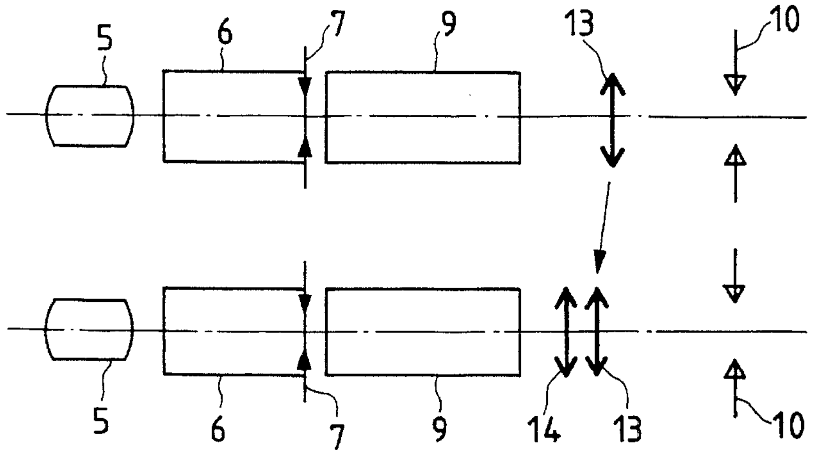
FIG. 4A
FIG. 4B
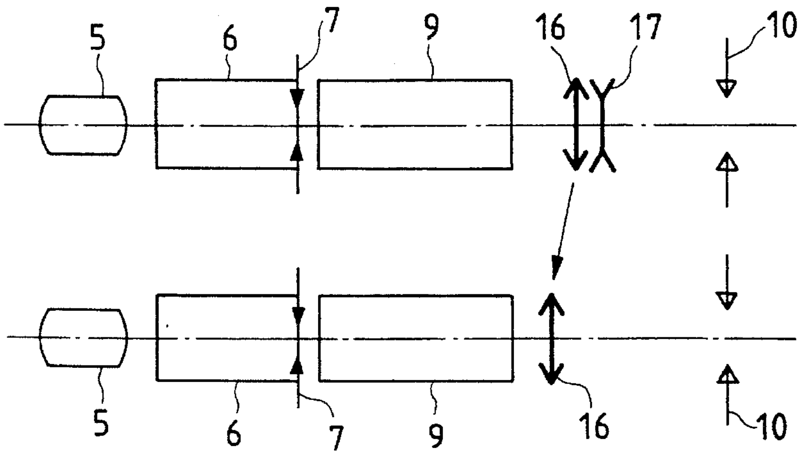

FIG. 5A
FIG. 5B
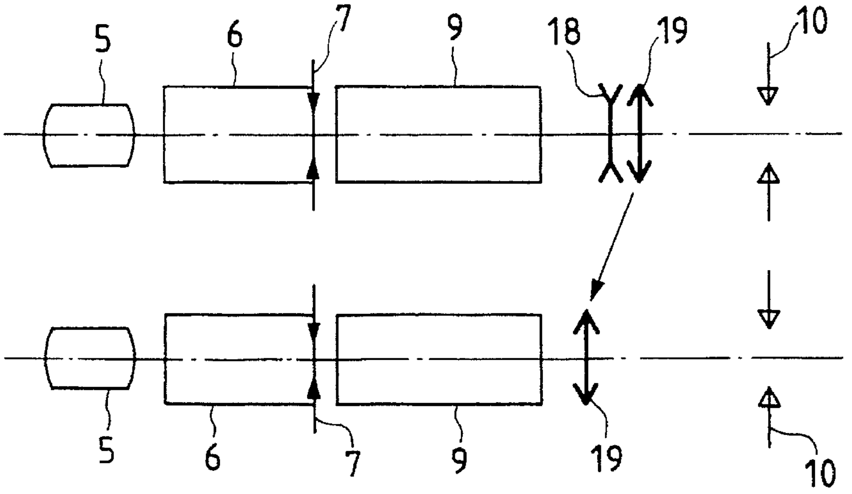
FIG. 6
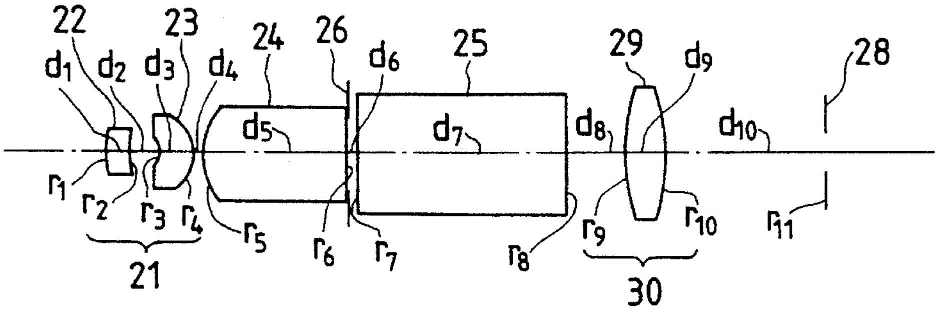
FIG. 7
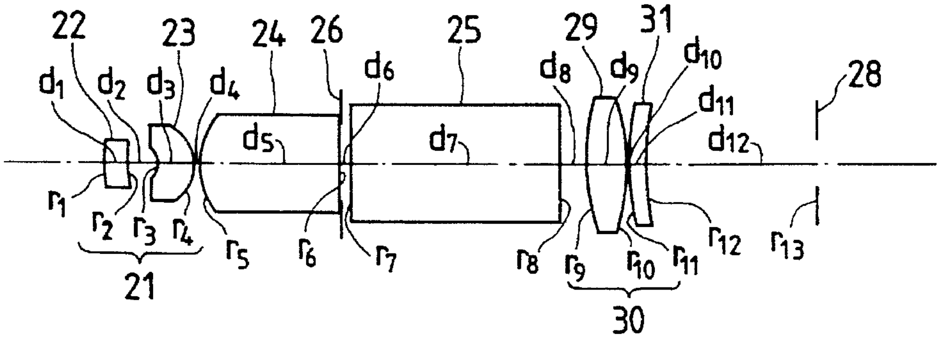

SPHERICAL ABERRATION

PUPIL DIAMETER=2.0mm

ASTIGMATISM

ω=23.5°

DISTORTION

ω=23.5°

SPHERICAL ABERRATION

PUPIL DIAMETER=2.0mm

ASTIGMATISM

ω=23.5°

DISTORTION

ω=23.5°

SPHERICAL ABERRATION

ASTIGMATISM

DISTORTION

SPHERICAL ABERRATION

ASTIGMATISM

DISTORTION

SPHERICAL ABERRATION

PUPIL DIAMETER=2.0mm

ASTIGMATISM $\omega = 26.9°$

DISTORTION $\omega = 26.9°$

SPHERICAL ABERRATION

PUPIL DIAMETER=2.0mm

ASTIGMATISM $\omega = 20.6°$

DISTORTION $\omega = 20.6°$

SPHERICAL ABERRATION

ASTIGMATISM

DISTORTION

SPHERICAL ABERRATION

ASTIGMATISM

DISTORTION

FINDER OPTICAL SYSTEM

BACKGROUND OF THE INVENTION

1. Field of the Invention

This Invention relates to a camera which can change a photographic range by converting a film size to which an image is photographed to another and, in particular, to a finder optical system for a camera which permits ordinary and panoramic photographies, independently of a photographic optical system.

2. Description of the Related Art

Recently, some of cameras for 35 mm film format have come to be able to trim the upper and lower portions of the image photographed on a film by placing a light-blocking plate adjacent to the upper and lower portions of a film surface within the camera. In this way, the image with a photographic film or print can be made long sideways, and thus panoramic photography that enhances such a wide-screen sensitivity has been popularized.

Most of the finder optical systems for cameras permitting panoramic photography have been designed to use the same field frame, indicative of the photographic range, of a 35 mm full size in the ordinary and panoramic photographies in such a way that frames for ordinary and panoramic photographies overlap the field frame. Specifically, as shown in FIG. 1, a field frame 1 has the marking of a panoramic frame 3, narrowed vertically, indicative of the photographic range for panoramic photography in a frame 2 indicative of the photographic range for ordinary photography. For this reason, when a photographer sees through the finder in the ordinary photography, the panoramic frame 3 overlaps a part of a field image in the frame 2 for ordinary photography. This prevents the recognition of the image of an object to be photographed. For panoramic photography, another image out of the photographic range will be viewed, and hence there is the defect in that the result of the photography is difficult to expect. In either case, since the frames 2 and 3 of two photographic ranges are viewed simultaneously, there is also the defect in that the photographer is liable to confuse the two photographic ranges.

In order to obviate these defects, some of the cameras are also constructed so that a single field frame is employed and its shape varies with the ordinary and panoramic photographies. In this case, however, when the photographic range observable in the panoramic photography is vertically decreased and converted into a shape narrowed to the panoramic frame, the area occupied by the visual field in the finder becomes narrow, with the resultant drawback of giving the photographer the impression that the visual field has diminished.

SUMMARY OF THE INVENTION

It is, therefore, an object of the present invention to provide a finder optical system in which a desired photographic range is accurately indicated in the finder by switching the shape of the field frame to the other and a finder magnification is changed in accordance with the photographic range indicated by the field frame to facilitate observation.

The finder optical system according to the present invention is constructed, as a real image mode finder optical system, with an objective system having a positive refracting power, a reflecting member for erecting an image formed by the objective system, and an eyepiece system having a positive refracting power. Included in the eyepiece system are a positive lens unit having at least one lens and movable along the optical axis and another lens unit having at least one lens and movable in and out of the optical path, which structure enables the focal length of the eyepiece system and finder magnification to be changed.

The finder optical system according to the present invention is used by switching the field frame by which different photographic ranges are indicated in the ordinary and panoramic photography modes.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 1 is a plan view showing a field frame in a finder optical system of the prior art;

FIGS. 2A and 2B are views showing fundamental arrangements in the ordinary and panoramic photography modes, respectively, of the finder optical system according to the present invention;

FIGS. 3A and 3B to 5A and 5B are views showing other fundamental arrangements, similar to FIGS. 2A and 2B, of the finder optical system according to the present invention;

FIGS. 6 and 7 are views showing the arrangements in the ordinary and panoramic photography modes, respectively, of the finder optical system according to a first embodiment of the present invention;

DETAILED DESCRIPTION OF THE PREFERRED EMBODIMENTS

Figure 8A:
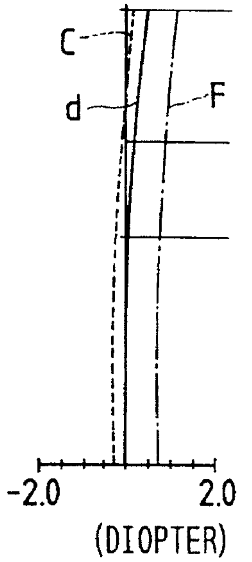
FIGS. 8A–8C and 9A–9C are aberration curve diagrams showing spherical aberration, astigmatism, and distortion in FIGS. 6 and 7.

In such type of finder optical system, if the eyepoint and the diopter are kept constant and the focal length of the eyepiece system is changed according to the ordinary or panoramic photography mode selected, the position of the entrance pupil of the objective system will be shifted. Thus, it becomes difficult to favorably maintain the performance for aberration of the objective system in both ordinary and panoramic photography modes. For this reason, the eyepiece system has to compensate the objective system for the aberration performance. For example, if it is assumed that the eyepiece system used in one photography mode consists of a single positive lens to be replaced entirely to thereby change the focal length according to the photography mode is switched to the other, it becomes difficult to favorably maintain the performance for aberration of the eyepiece system in both photography modes. Hence, in order to hold favorably the aberration in both photography modes, the number of lenses must be increased in one photography mode. This requires the eyepiece system to have at least three components in view of the use of respective lenses in both photography modes. However, the increase of the number of components of the eyepiece system causes the problem of raising the costs.

Thus, the present invention provides a finder optical system which is relatively low in cost and good in performance for aberration while the diopter is kept constant by the use of a lens common to the ordinary and panoramic photography modes.

The principle of the present invention will be explained below in reference to FIGS. 2A and 2B to FIGS. 5A and 5B. In the arrangements of the finder optical system shown in FIGS. 2A and 2B, a first reflecting member 6, such as a prism, for reflecting a beam of light is disposed behind an objective system 5 (on the eyepoint side) and, adjacent to its exit face, an inverted image is formed by the objective system 5. In the vicinity of the image, a field frame 7 is placed which indicates the photographic range in the ordinary photography mode (see FIG. 2A). The field frame 7 is provided with a variable mechanism by which the shape representative of the field range is changed to indicate the range of panoramic photography narrowed vertically in the panoramic photography mode (see FIG. 2B). Behind the field frame 7, a second reflecting member 9 is disposed which further reflects the light beam to erect the image formed by the objective system 5, and a lens unit 11 having a positive refracting power and acting as an eyepiece system used in the ordinary photography mode is provided between the second reflecting member 9 and an eyepoint 10. The eyepiece system is designed so that when the operation is changed over to the panoramic photography mode, the positive lens unit 11 having at least one lens is moved toward the object and, in addition, a lens unit 12 having a positive refracting power is inserted in the optical path of the positive lens unit 11 on the side of the eyepoint 10 (See FIG. 2B).

As shown in FIGS. 3A and 3B, a lens unit 13 having at least one lens and placed as an eyepiece system in the ordinary photography mode may also be moved toward the object and a lens unit 14 having a positive refracting power may be inserted between the positive lens unit 13 and the second reflecting member 9 when the conversion to the panoramic photography mode is made. Consequently, the eyepiece system composed of these eyepiece lens units 11 and 12 or 13 and 14 diminishes in focal length and increases in finder magnification compared with the eyepiece system in the ordinary photography mode. By the above arrangement, the diopter and eyepoint before and after the changeover of the finder magnification can be kept constant.

In accordance with FIGS. 4A and 4B and FIGS. 5A and 5B, reference is made to other fundamental arrangements of the present invention. The finder optical system depicted in FIG. 4A shows the arrangement in the ordinary photography mode. A lens unit 16 having a positive refracting power and a lens unit 17 having a negative refracting power are arranged in order between the second reflecting member 9 and the eyepoint 10, and constitute the eyepiece system. When the operation is changed over to the panoramic photography mode as shown in FIG. 4B, the negative lens unit 17 is removed from the optical path and at the same time, the positive lens unit 16 having at least one lens is moved toward the object.

As illustrated in FIGS. 5A and 5B, a lens unit 18 having a negative refracting power and a lens unit 19 having a positive refracting power, as the eyepiece system in the ordinary photography, are arranged in order from the object side. In this case, the arrangement may well be made such that when the operation is converted to the panoramic photography mode, the lens unit 18 having a negative refracting power is removed from the optical path and the positive lens unit 19 having at least one lens is moved toward the object. The eyepiece system composed of the lens unit 16 or the lens unit 19 is great in focal length and high in finder magnification compared with the eyepiece system in the ordinary photography mode. By the above arrangement, the diopter and eyepoint before and after the changeover of the finder magnification can be kept constant.

If the lens unit 11, 13, 16 or 19, which is kept inserted in the optical path in both ordinary and panoramic photography modes, comprises a plurality of lenses the arrangement of the eyepiece system shown in FIGS. 2A and 2B, FIGS. 3A and 3B, 4A–4B, or 5A–5B can be modified so that the lens unit 12, 14, 17 or 18 is inserted into and removed from a space between the plurality of lenses included in the lens unit 11, 13, 16 or 19 in accordance with the switching between the ordinary and panoramic photography modes.

Also, with the finder optical system of the present invention shown in FIGS. 2A and 2B to FIGS. 5A and 5B as mentioned above, when the operation is converted from the ordinary photography mode to the panoramic photography mode, it is necessary to define the amount of movement of the positive lens unit shifted toward the object and to correct for aberration with lens configurations in both photography modes. For this purpose, it is desirable to satisfy the condition $$4.5<|f_I/f_L|<8 \qquad (1)$$

where fI is the compound focal length of the lens unit of the eyepiece system inserted in the optical path when the focal length of the eyepiece system is changed, and $f_L$ is the compound focal length of the lens unit of the eyepiece system held in the optical path when the focal length of the eyepiece system is changed.

If the lower limit of Condition (1) is exceeded, the amount of movement of the positive lens unit will decrease, but the performance for aberration before and after the changeover will reduce, with result that it becomes difficult to keep the diopter constant. Contrary, beyond the upper limit, the amount of movement of the positive lens unit will increase and the positive lens unit interfere with the reflecting member or the removable lens, which situation is unfavorable.

Hence, when the operation is switched from the mode of ordinary photography to the mode of panoramic photography, the shape of the field frame 7 is changed to that for panoramic photography whose range is narrowed vertically. At the same time, the positive lens unit 12 or 14 is inserted in the optical path, or the negative lens unit 17 or 18 is removed from the optical path. Subsequently, the positive lens unit 11, 13, 16 or 19 is moved, based on Condition (1), toward the object by a desired amount. Thus, since the focal length of the eyepiece system decreases and the finder magnification increases, the narrowed field range of the field frame 7 can be enlarged and observed. In both photography modes, aberration is favorably corrected and at the same time, the diopter and eyepoint can be kept constant.

Referring to the drawings shown, the embodiments of the present invention will be explained in detail below.

FIGS. 6 and 7 show the first embodiment of the present invention. FIG. 6 shows the first embodiment in an ordinary photography mode and FIG. 7 shows it in a panoramic photography mode. In FIG. 6, an objective system 21 of the finder optical system is composed of objective lenses 22 and 23 and, behind it (on the eyepoint side), two prisms 24 and 25 are disposed which twice-reflects a beam of light to erect the image of the objective system 21. In the vicinity of the imaging position, located between the prisms 24 and 25, of an inverted image caused by the objective system 21, a field frame 26 is provided which has a field range corresponding to the photographic range for ordinary photography. The field frame 26 is provided with a variable mechanism not shown such that when the operation is switched to the panoramic photography mode, the field frame is narrowed in a vertical direction and changed to the shape of the field range corresponding to the photographic range for panoramic photography (refer to FIG. 7). Further, an eyepiece system 30 consisting of a positive lens 29 is disposed between the rear prism 25 and an eyepoint 28 (refer to FIG. 6). The eyepiece system 30 is constructed so that when the conversion into the panoramic photography mode shown in FIG. 7 is carried out, the positive lens 29 is moved toward the prism 25 and a positive lens 31 is inserted in the optical path to reduce the focal length of the eyepiece system 30. The magnification of the finder optical system is thus improved. Also, the amount of movement of the positive lens 29 is set by Condition (1). The changeover of the finder magnification is made in association with that of the photographic range, namely a photographing film size.

Since the first embodiment is constructed as in the foregoing, the positive lens 29 is located, as the eyepiece system 30, in the ordinary photography mode, and the light beam of the object image passing through the objective system 21 is twice-reflected by the prism 24 and imaged intermediately as an inverted image. The light beam is further twice-reflected, through the field frame 26, by the prism 25, so that the image is erected. The photographer can thus observe the photographic field of the field frame 26 through the eyepiece system 30 at the eyepoint 28. On the other hand, when the conversion to the panoramic photography mode is made, as shown in FIG. 7, the shape of the field frame 26 is changed to a size for panoramic photography mode. At the same time, in the eyepiece system 30, the positive lens 29 is moved toward the prism 25 and the positive lens 31 is inserted in the optical path. The magnification of the finder optical system thus increases. Consequently, the photographer can enlarge and observe the photographic field of the panoramic photography narrowed vertically. Also, if the finder optical system is returned to the state of ordinary photography, the original state shown in FIG. 6 is brought about.

As mentioned above, the first embodiment is capable of correctly indicating the photographic range necessary for the finder by changing the shape of the field frame with respect to the ordinary and panoramic photographies. Moreover, in the panoramic photography mode whose range is narrowed, the finder magnification is increased and thereby the photographic field can be enlarged and observed. The observation can thus be facilitated without giving the photographer the impression that the visual field has reduced. In the change from the ordinary photography mode to the panoramic photography mode, the positions of the intermediate imaging plane and the eyepoint are not shifted. This does not give the photographer a sense of incompatibility. Also, in addition to the fact that aberration is favorably corrected in both photography modes, the finder optical system has a relatively simple mechanism and is small in size.

Figure 8B:
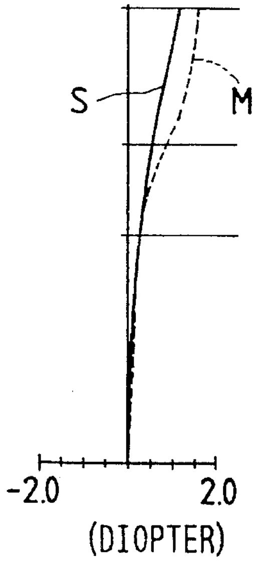
Figure 8C:
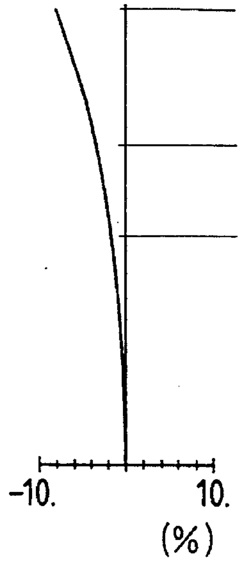
Figure 9A:
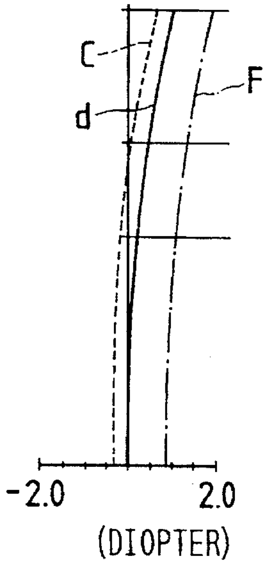
Figure 9B:
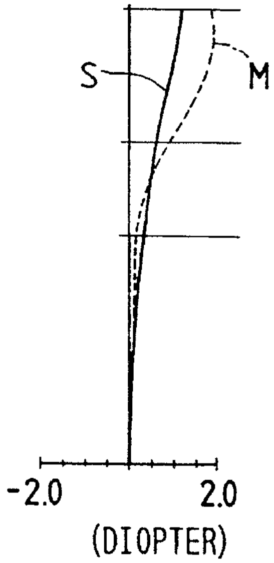
Figure 9C:
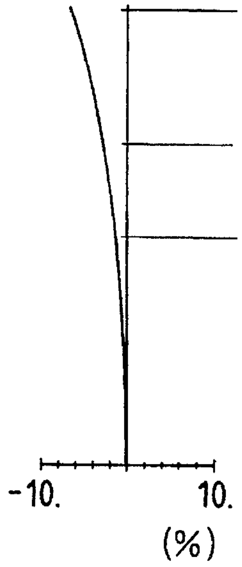

The numerical data of the first embodiment are as follows: For Condition (1), $|fI/fL|=5.3$. The magnification and the angle of field in the ordinary photography mode are 0.4 and 23.5°, and those in the panoramic photography mode are 0.48 and 23.5°, respectively. FIGS. 8A–8C show spherical aberration, astigmatism and distortion respectively for the ordinary photography mode and FIGS. 9A–9C for the panoramic photography mode.

(Ordinary photography mode)

| | | | |
|---|---|---|---|
| r1 = 9.4966 | | | |
| | d1 = 2.5000 | n1 = 1.49241 | ν1 = 57.66 |
| r2 = 32.0217 (aspherical) | d2 = 2.7303 | | |
| r3 = −2.5989 | | | |
| | d3 = 3.5000 | n2 = 1.58423 | ν2 = 30.49 |
| r4 = −4.3652 (aspherical) | d4 = 0.4645 | | |
| r5 = 4.9370 (aspherical) | d5 = 14.0000 | n3 = 1.49241 | ν3 = 57.66 |
| r6 = ∞ | | | |
| | d6 = 0.5000 | | |
| r7 = 119.7271 | | | |
| | d7 = 20.000 | n4 = 1.49241 | ν4 = 57.66 |
| r8 = ∞ | | | |
| | d8 = 5.9082 | | |
| r9 = 18.7810 (aspherical) | d9 = 3.5000 | n5 = 1.49241 | ν5 = 57.66 |
| r10 = −21.7183 | | | |
| | d10 = 14.9493 | | |
| r11 = (eyepoint) | | | |

Aspherical coefficients

Second surface

P = 1.0000, E = 0.21661 × $10^{-2}$,
F = −0.47391 × $10^{-2}$, G = 0.19852 × $10^{-2}$

Third surface

P = 1.0000, E = 0.10352 × $10^{-1}$,
F = −0.16926 × $10^{-2}$, G = −0.39250 × $10^{-3}$

Fourth surface

P = 1.0000, E = −0.40649 × $10^{-3}$,
F = 0.47490 × $10^{-4}$, G = −0.13164 × $10^{-4}$

Fifth surface

P = 1.0000, E = −0.26774 × $10^{-2}$,
F = 0.67891 × $10^{-4}$, G = −0.34017 × $10^{-5}$

Ninth surface

P = 1.0000, E = −0.62557 × $10^{-4}$,
F = 0.19878 × $10^{-6}$, G = −0.60456 × $10^{-8}$ (Panoramic photography mode)

| | | | |
|---|---|---|---|
| r1 = 9.4966 | | | |
| | d1 = 2.5000 | n1 = 1.49241 | ν1 = 57.66 |
| r2 = 32.0217 (aspherical) | d2 = 2.7303 | | |
| r3 = −2.5989 (aspherical) | d3 = 3.5000 | n2 = 1.58423 | ν2 = 30.49 |
| r4 = −4.3652 (aspherical) | d4 = 0.4645 | | |
| r5 = 4.9370 (aspherical) | d5 = 14.0000 | n3 = 1.49241 | ν3 = 57.66 |
| r6 = ∞ | | | |
| | d6 = 0.5000 | | |
| r7 = 119.7271 | | | |
| | d7 = 20.000 | n4 = 1.49241 | ν4 = 57.66 |
| r8 = ∞ | | | |
| | d8 = 2.6682 | | |
| r9 = 18.7810 (aspherical) | d9 = 3.5000 | n5 = 1.49241 | ν5 = 57.66 |
| r10 = 21.7183 | | | |
| | d10 = 0.2000 | | |
| r11 = 18.1996 | | | |

-continued

| | | | |
|---|---|---|---|
| | d11 = 2.0000 | n6 = 1.49241 | ν6 = 57.66 |
| r12 = 26.2175 | | | |
| | d12 = 15.9893 | | |
| r13 = (eyepoint) | | | |

Aspherical coefficients

| | | |
|---|---|---|
| Second surface | P = 1.0000, F = −0.47391 × $10^{-2}$, | E = 0.21661 × $10^{-2}$, G = 0.19852 × $10^{-2}$ |
| Third surface | P = 1.0000, F = −0.16926 × $10^{-2}$, | E = 0.10352 × $10^{-1}$, G = −0.39250 × $10^{-3}$ |
| Fourth surface | P = 1.0000, F = 0.47490 × $10^{-4}$, | E = −0.40649 × $10^{-3}$, G = −0.13164 × $10^{-4}$ |
| Fifth surface | P = 1.0000, F = 0.67891 × $10^{-4}$, | E = −0.26774 × $10^{-2}$, G = −0.34017 × $10^{-5}$ |
| Ninth surface | P = 1.0000, F = 0.19878 × $10^{-6}$, | E = −0.62557 × $10^{-4}$, G = −0.60456 × $10^{-8}$ |

Figure 10:
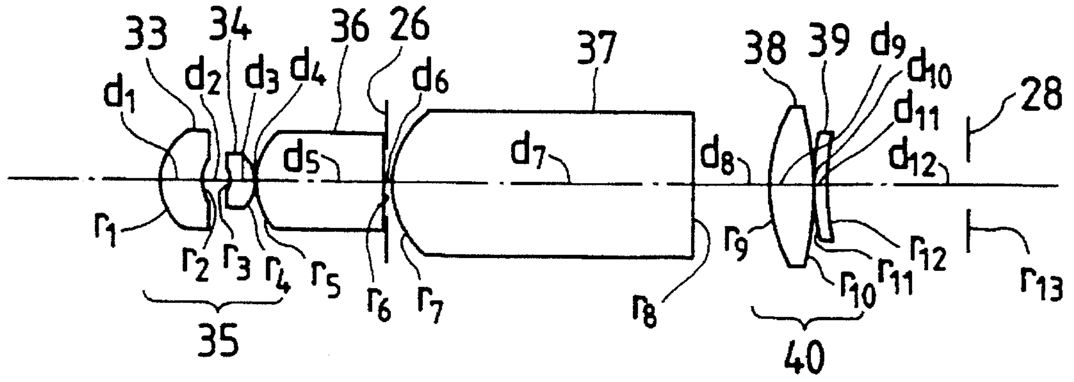
FIGS. 10 and 11 are views showing the arrangements in the ordinary and panoramic photography modes, respectively, of the finder optical system according to a second embodiment of the present invention.
Figure 11:
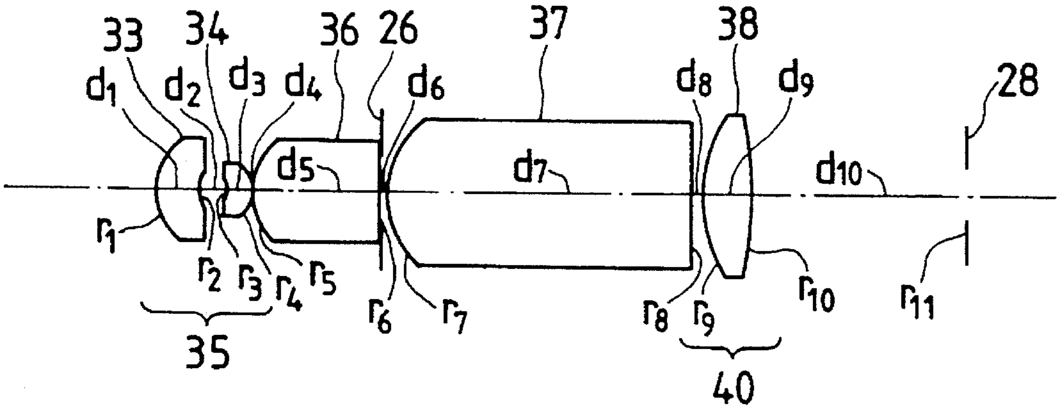

Next, in accordance with FIGS. 10 and 11, the second embodiment of the present invention is explained. FIG. 10 shows the second embodiment in an ordinary photography mode and FIG. 11 shows it in a panoramic photography mode. In the mode of ordinary photography shown in FIG. 10, the finder optical system includes, in order from the object side, an objective system 35 composed of objective lenses 33 and 34; a prism 36 twice-reflecting a beam of light; the field frame 26 assuming the shape for ordinary photography, located adjacent to the intermediate imaging position by the objective system 35; and a prism 37 twice-reflecting again the light beam. Further, between the prism 37 and the eyepoint 28, an eyepiece system 40 is disposed which consists of a positive lens 38 and a negative lens 39 located behind it. When the operation is switched to the mode of panoramic photography, the field frame 26 is changed to the shape for panoramic photography and narrowed vertically. At the same time, in the eyepiece system 40, the positive lens 38 is moved toward the object and the negative lens 39 is removed from the optical path.

In the second embodiment also, since the finder magnification is increased by changing over the ordinary photography mode to the panoramic photography mode, the photographic field narrowed vertically is enlarged and the observation of the photographic range is facilitated. Also, the positions of the intermediate imaging plane and the eyepoint 28 are not shifted during the changeover.

Figure 12A:
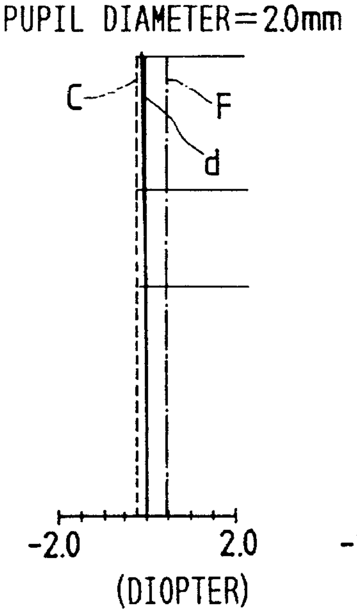
FIGS. 12A–12C and 13A–13C are aberration curve diagrams in FIGS. 10 and 11.
Figure 12B:
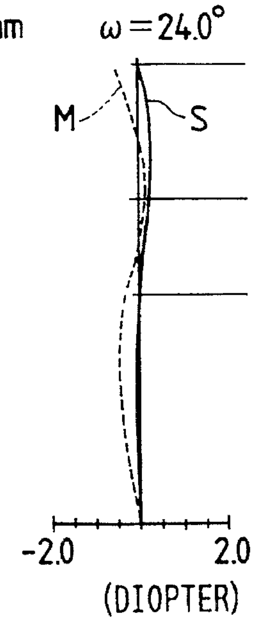
Figure 12C:
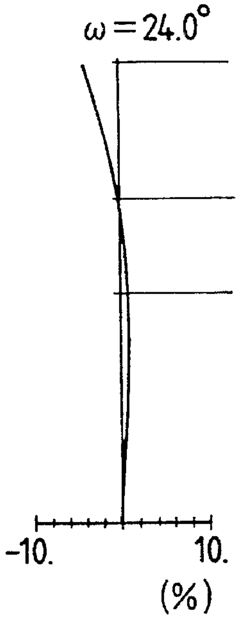
Figure 13A:
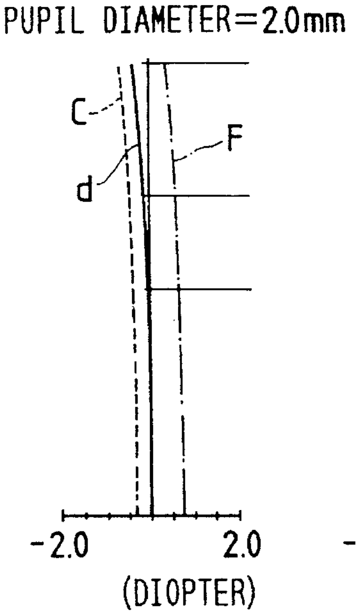
Figure 13B:
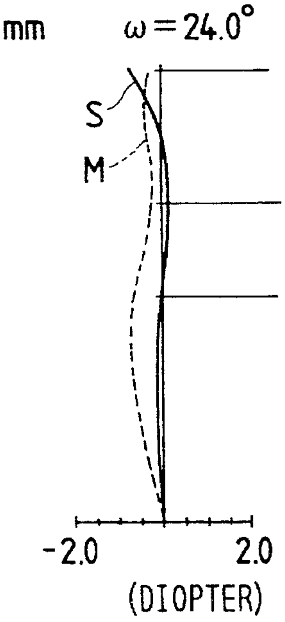
Figure 13C:
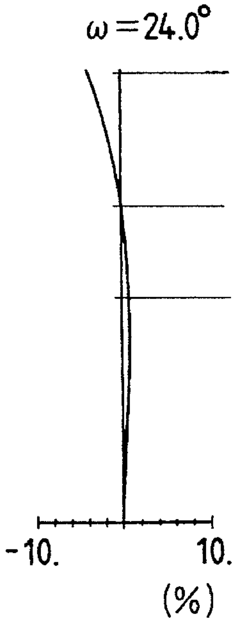

The numerical data of the second embodiment are shown below. For Condition (1), $|fI/fL|=4.67$. The magnification and the angle of field in the ordinary photography mode are 0.4 and 24.0°, and those in the panoramic photography mode are 0.48 and 24.0°, respectively. FIGS. 12A–12C show spherical aberration, astigmatism, and distortion respectively for the ordinary photography mode and FIGS. 13A–13C for the panoramic photography mode.

(Ordinary photography mode)

| | | | |
|---|---|---|---|
| r1 = 4.7151 | | | |
| | d1 = 3.5000 | n1 = 1.49241 | ν1 = 57.66 |
| r2 = 6.9312 (aspherical) | d2 = 1.8287 | | |

-continued

| | | | |
|---|---|---|---|
| r3 = −2.1077 (aspherical) | d3 = 2.0000 | n2 = 1.49241 | ν2 = 57.66 |
| r4 = −2.8843 (aspherical) | d4 = 0.2000 | | |
| r5 = 4.5426 (aspherical) | d5 = 10.0000 | n3 = 1.49241 | ν3 = 57.66 |
| r6 = ∞ | | | |
| | d6 = 0.5000 | | |
| r7 = 7.7444 | | | |
| | d7 = 23.5000 | n4 = 1.49241 | ν4 = 57.66 |
| r8 = ∞ | | | |
| | d8 = 5.7793 | | |
| r9 = 11.7867 (aspherical) | d9 = 3.5000 | n5 = 1.49241 | ν5 = 57.66 |
| r10 = −33.7225 | | | |
| | d10 = 0.2000 | | |
| r11 = 36.7815 | | | |
| | d11 = 1.0000 | n6 = 1.58423 | ν6 = 30.49 |
| r12 = 20.9242 | | | |
| | d12 = 11.0000 | | |
| r13 = (eyepoint) | | | |

Aspherical coefficients

| | | |
|---|---|---|
| Second surface | P = 1.0000, F = −0.35206 × $10^{-3}$, | E = 0.63168 × $10^{-2}$, G = −0.16450 × $10^{-3}$ |
| Third surface | P = 1.0000, F = −0.38212 × $10^{-2}$, | E = 0.14361 × $10^{-1}$, G = −0.18124 × $10^{-3}$ |
| Fourth surface | P = 1.0000, F = −0.11557 × $10^{-2}$, | E = 0.75526 × $10^{2}$, G = 0.68243 × $10^{-4}$ |
| Fifth surface | P = 1.0000, F = −0.25661 × $10^{-3}$, | E = −0.43864 × $10^{-3}$, G = 0.10868 × $10^{-4}$ |
| Ninth surface | P = 1.0000, F = 0.20957 × $10^{-5}$, | E = −0.11777 × $10^{-3}$, G = −0.40978 × $10^{-7}$ |

(Panoramic photograph mode)

| | | | |
|---|---|---|---|
| r1 = 4.7151 | | | |
| | d1 = 3.5000 | n1 = 1.49241 | ν1 = 57.66 |
| r2 = 6.9312 (aspherical) | d2 = 1.8287 | | |
| r3 = −2.1077 (aspherical) | d3 = 2.0000 | n2 = 1.49241 | ν2 = 57.66 |
| r4 = −2.8843 (aspherical) | d4 = 0.2000 | | |
| r5 = 4.5426 (aspherical) | d5 = 10.0000 | n3 = 1.49241 | ν3 = 57.66 |
| r6 = ∞ | | | |
| | d6 = 0.5000 | | |
| r7 = 7.7444 | | | |
| | d7 = 23.5000 | n4 = 1.49241 | ν4 = 57.66 |
| r8 = ∞ | | | |
| | d8 = 1.1459 | | |
| r9 = 11.7867 (aspherical) | d9 = 3.5000 | n5 = 1.49241 | ν5 = 57.66 |
| r10 = −33.7225 | | | |
| | d10 = 16.8334 | | |
| r11 = (eyepoint) | | | |

Aspherical coefficients

| | | |
|---|---|---|
| Second surface | P = 1.0000, F = −0.35206 × $10^{-3}$, | E = 0.63168 × $10^{-2}$, G = −0.16450 × $10^{-3}$ |
| Third surface | P = 1.0000, F = −0.38212 × $10^{-2}$, | E = 0.14361 × $10^{-1}$, G = −0.18124 × $10^{-3}$ |
| Fourth surface | P = 1.0000, F = −0.11557 × $10^{-2}$, | E = 0.75526 × $10^{-2}$, G = 0.68243 × $10^{-4}$ |

-continued

| | | |
|---|---|---|
| Fifth surface | | |
| | P = 1.0000, | E = −0.43864 × $10^{-3}$, |
| | F = −0.25661 × $10^{-3}$, | G = 0.10868 × $10^{-4}$ |
| Ninth surface | | |
| | P = 1.0000, | E = −0.11777 × $10^{-3}$, |
| | F = 0.20957 × $10^{-5}$, | G = −0.40978 × $10^{-7}$ |

Figures 14A, 14B, 14C:
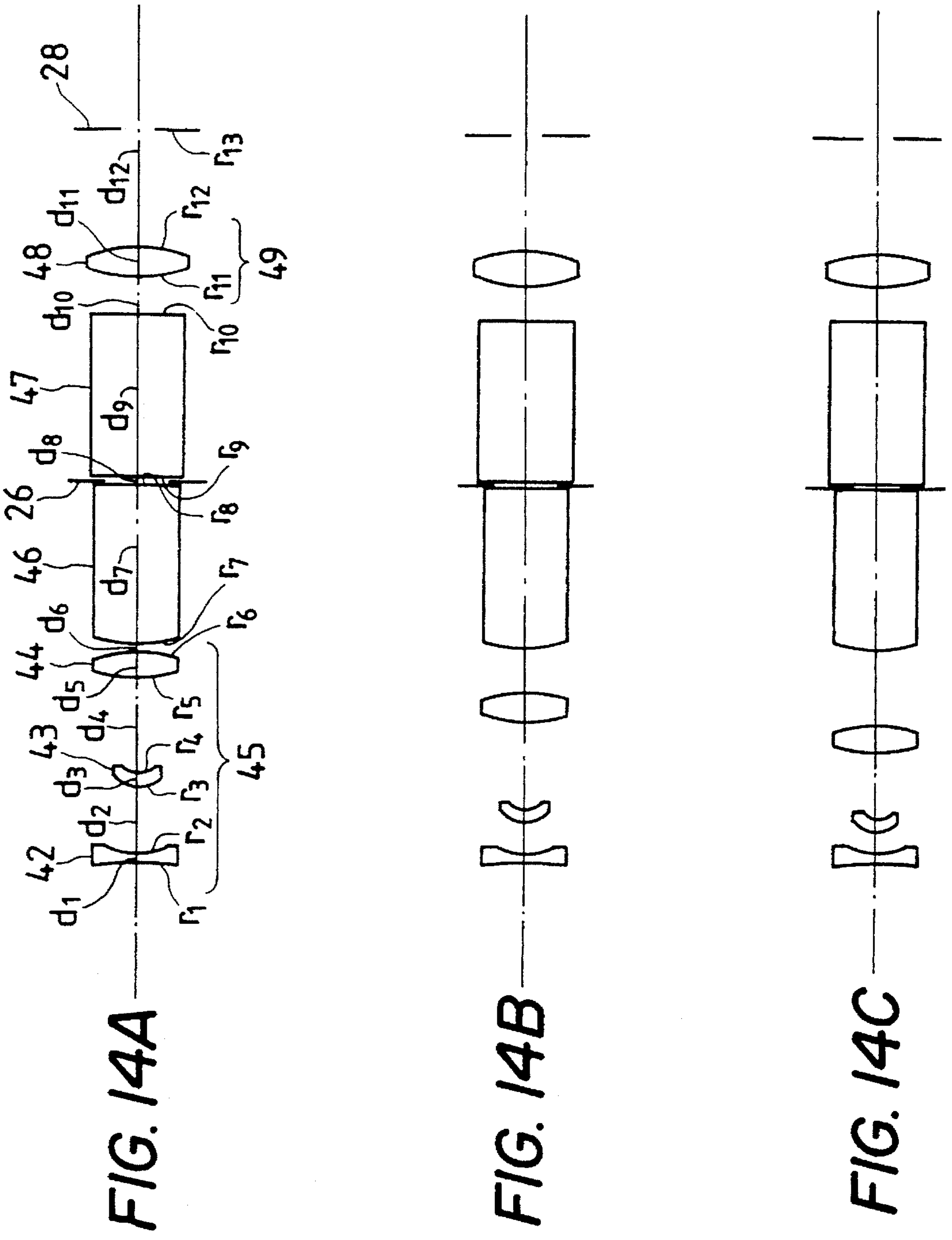
FIGS. 14A–14C and 15A–15C are views showing the arrangements in terms of wide angle, middle, and telephoto positions in the ordinary and panoramic photography modes, respectively, of the finder optical system according to a third embodiment of the present invention.
Figure 15A:
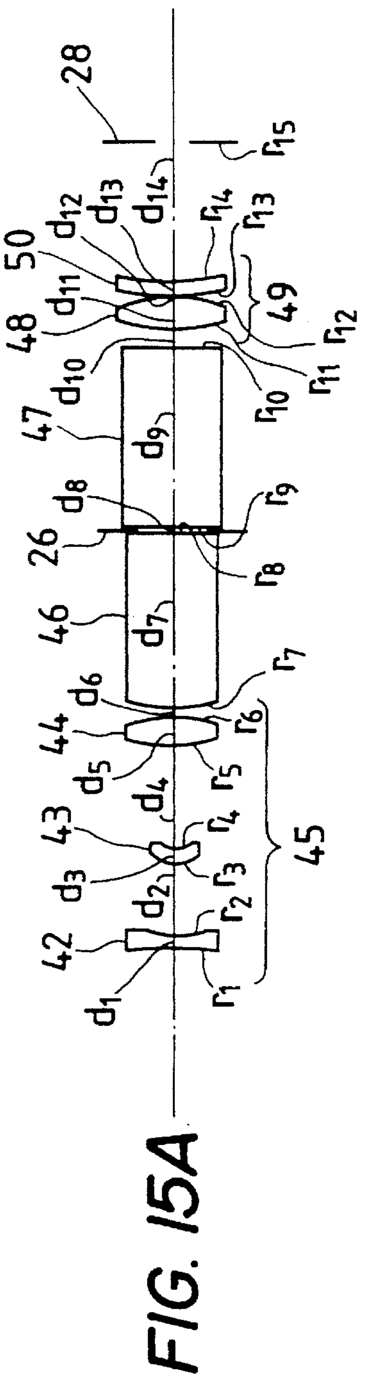
Figure 15B:
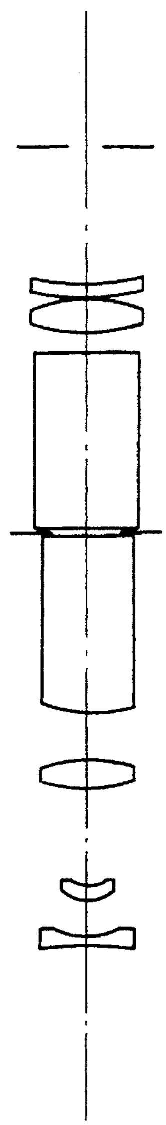
Figure 15C:
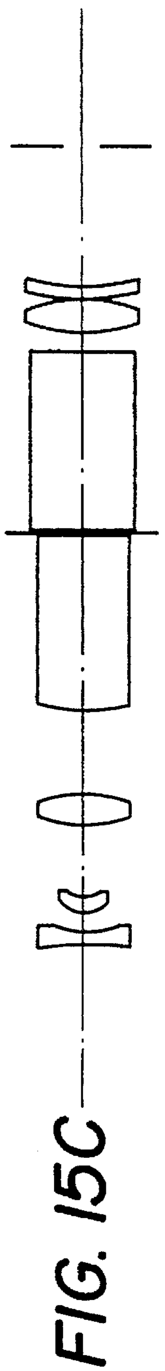
Figure 16A:
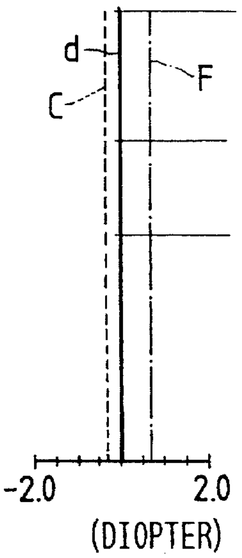
FIGS. 16A–16C, 17A–17C, and 18A–18C are aberration curve diagrams in FIGS. 14A–14C.
Figure 16B:
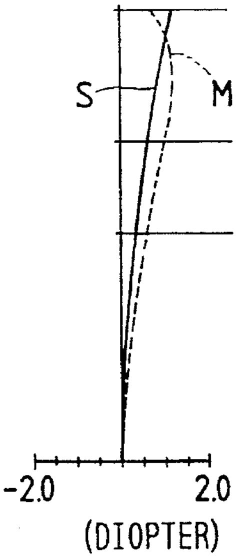
Figure 16C:
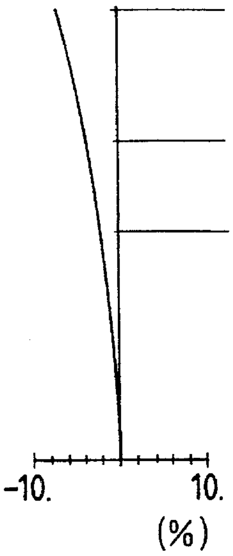
Figure 17A:
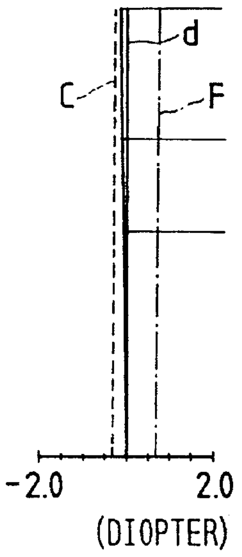
Figure 17B:
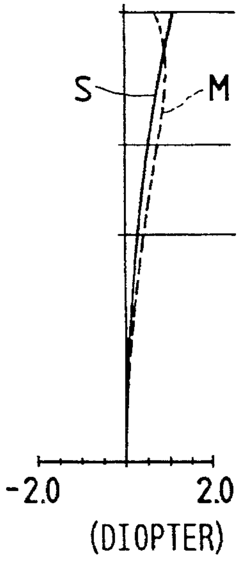
Figure 17C:
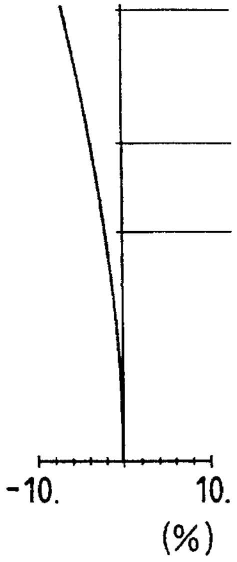
Figure 18A:
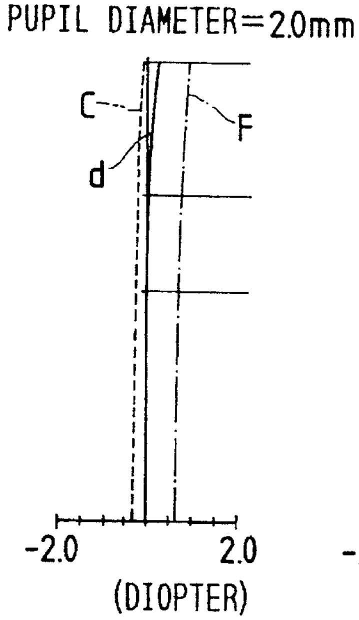
Figure 18B:
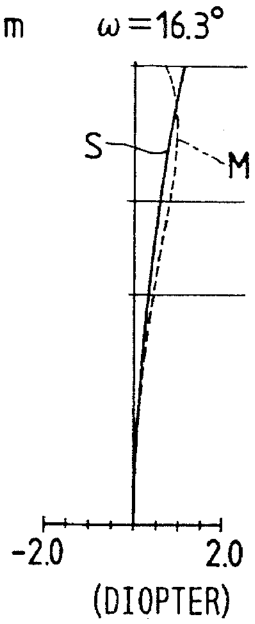
Figure 18C:
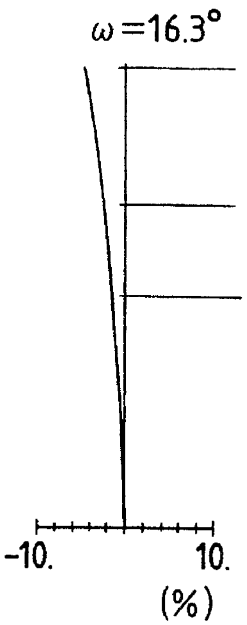
Figure 19A:
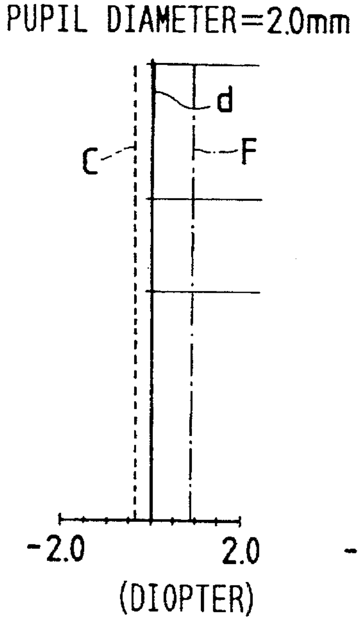
FIGS. 19A–19C, 20A–20C, and 21A–21C are aberration curve diagrams in FIGS. 15A–15C.
Figure 19B:
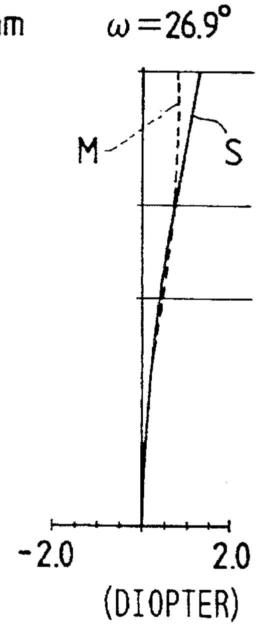
Figure 19C:
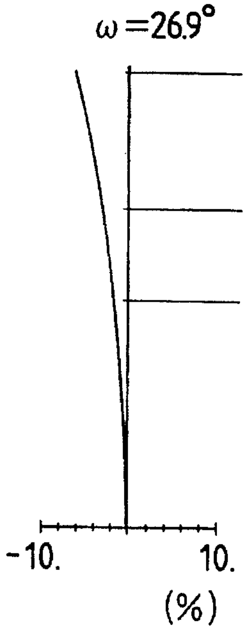
Figure 20A:
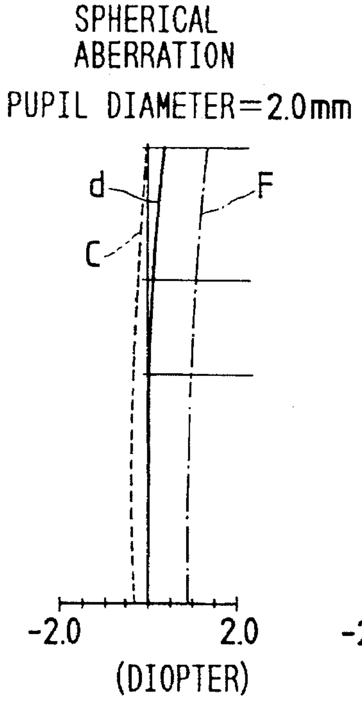
Figure 20B:
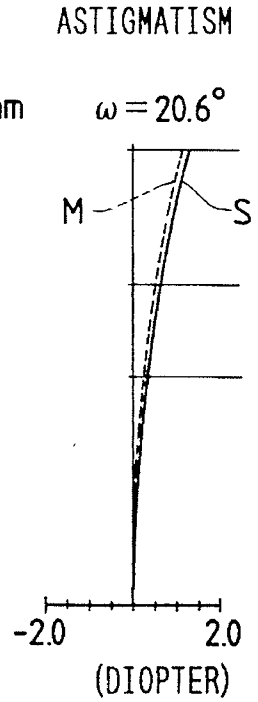
Figure 20C:
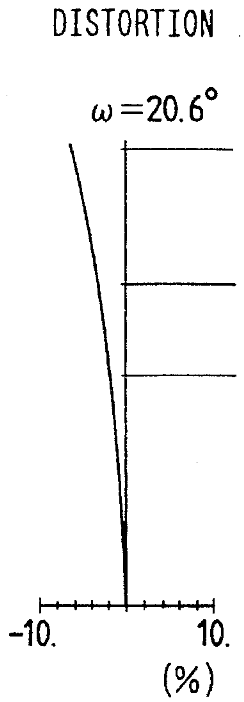
Figure 21A:
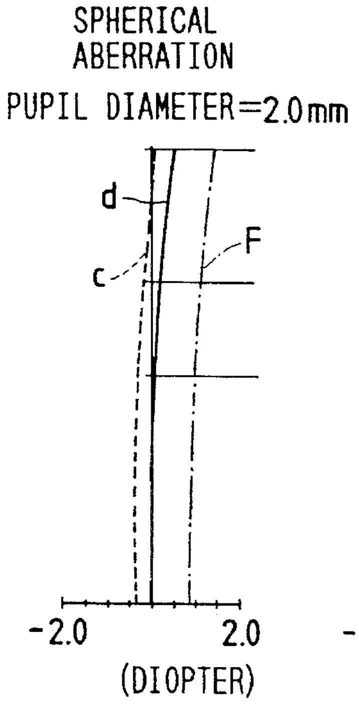
Figure 21B:
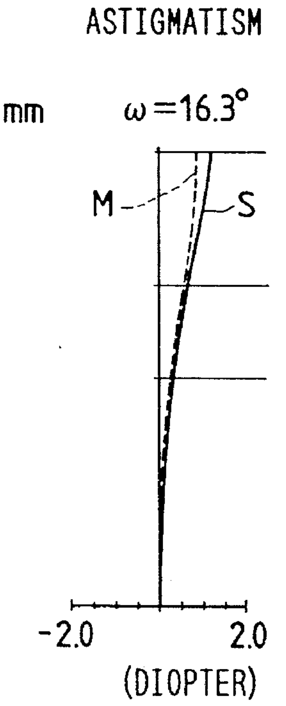
Figure 21C:
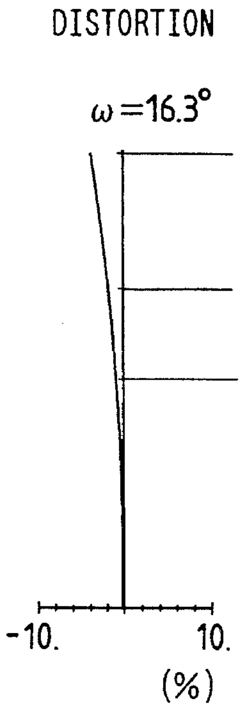
Figure 22:
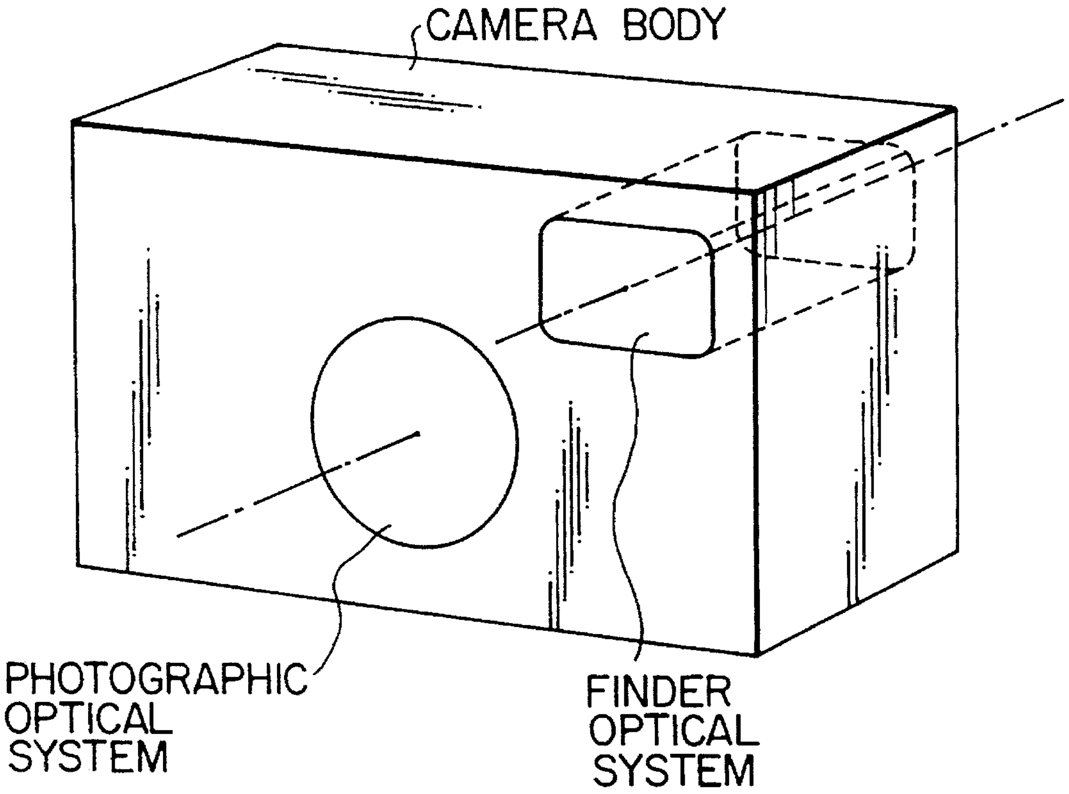
FIG. 22 shows one type of camera which permits ordinary and panoramic photography independent of a photographic optical system.

Referring now to FIGS. 14A–14C and 15A–15C, the third embodiment of the present invention explained. The finder optical system according to the third embodiment is a variable magnification finder optical system. In the mode of ordinary photography shown in FIG. 14A–14C, the finder optical system comprises, in order from the object side, an objective system 45 of zooming structure in which second and third objective lenses 43 and 44 can be moved toward a first lens 42 along the optical axis; a prism 46 twice-reflecting a beam of light; the field frame 26 assuming the shape for ordinary photography, disposed adjacent to the intermediate imaging position by the objective system 45; and a prism 47 situated behind the prism 46, for twice-reflecting the light beam. Further, an eyepiece system 49 composed of a positive lens 48 is disposed between the prism 47 and the eyepoint 28. When the conversion to the mode of panoramic photography is carried out as shown in FIGS. 15A–15C, the field frame 26 is changed to the shape for panoramic photography. At the same time, in the eyepiece system 49, the positive lens 48 is moved toward the object and the positive lens 50 is inserted behind it. The finder magnification thus increases. FIGS. 14A and 15A show a wide angle position, FIGS. 14B and 15B show a middle position, and FIGS. 14C and 15C show a telephoto position. FIGS. 16A–16C, 17A–17C, and 18A–18C show respectively spherical aberration, astigmatism, and distortion for the wide angle position, the middle position, and the telephoto position of the ordinary photography position, and FIGS. 19A–19C, 20A–20C, and 21A–21C are respectively the same but for the panoramic photogrpahy mode.

The numerical data of the third embodiment are as follows: For Condition (1), |fI/fL|=5.30.

(Ordinary photography mode)

The magnification and the angle of field at the wide angle position in the ordinary photography mode are 0.37 and 26.9° and those at the telephoto position are 0.62 and 16.3°, respectively.

| | | | |
|---|---|---|---|
| r1 = −62.7011 | | | |
| | d1 = 0.999 | n1 = 1.58423 | v1 = 30.49 |
| r2 = 9.5869 (aspherical) | | | |
| | d2 = D1 (variable) | | |
| r3 = 4.0210 (aspherical) | | | |
| | d3 = 1.499 | n2 = 1.49241 | v2 = 57.66 |
| r4 = 4.5664 | | | |
| | d4 = D2 (variable) | | |
| r5 = 16.9462 (aspherical) | | | |
| | d5 = 3.250 | n3 = 1.49241 | v3 = 57.66 |
| r6 = −15.4663 | | | |
| | d6 = D3 (variable) | | |
| r7 = 18.9566 (aspherical) | | | |
| | d7 = 20.500 | n4 = 1.49241 | v4 = 57.66 |
| r8 = ∞ | | | |
| | d8 = 0.500 | | |
| r9 = 119.7271 | | | |
| | d9 = 21.000 | n5 = 1.49241 | v5 = 57.66 |
| r10 = ∞ | | | |
| | d10 = 5.239 | | |

-continued

| | | | |
|---|---|---|---|
| r11 = 18.7810 (aspherical) | | | |
| | d11 = 3.500 | n6 = 1.49241 | v6 = 57.66 |
| r12 = −21.7183 | | | |
| | d12 = 14.949 | | |
| r13 = (eyepoint) | | | |

| | | |
|---|---|---|
| Aspherical coefficients | | |
| Second surface | | |
| | P = 2.1117, | E = −0.65588 × $10^{-3}$, |
| | F = −0.57034 × $10^{-5}$, | G = 0.33129 × $10^{-6}$, |
| | H = −0.11289 × $10^{-7}$ | |
| Third surface | | |
| | P = 0.7615, | E = −0.94324 × $10^{-3}$, |
| | F = −0.91685 × $10^{-5}$, | G = 0.22204 × $10^{-5}$, |
| | H = −0.324 × $10^{-6}$ | |
| Fifth surface | | |
| | P = 3.9228, | E = −0.12187 × $10^{-3}$, |
| | F = −0.39160 × $10^{-5}$, | G = 0.18493 × $10^{-6}$, |
| | H = −0.34037 × $10^{-8}$ | |
| Seventh surface | | |
| | P = 0.4096, | E = −0.28892 × $10^{-4}$, |
| | F = −0.76300 × $10^{-6}$, | G = 0.92888 × $10^{-7}$, |
| | H = −0.37589 × $10^{-8}$ | |
| Eleventh surface | | |
| | P = 1.0000, | E = −0.62557 × $10^{-4}$, |
| | F = 0.19878 × $10^{-6}$, | G = −0.60456 × $10^{-8}$ |

Zoom data

| | Wide angle position | Middle position | Telephoto position |
|---|---|---|---|
| D1 | 9.2653 | 4.3636 | 3.1135 |
| D2 | 12.0428 | 11.5399 | 8.7054 |
| D3 | 0.9192 | 5.8828 | 9.7197 |

(Panoramic photography mode)

The magnification and the angle of field at the wide angle position in the panoramic photography mode are 0.44 and 26.9° and those at the telephoto position are 0.75 and 16.3°, respectively.

| | | | |
|---|---|---|---|
| r1 = −62.7011 | | | |
| | d1 = 0.999 | n1 = 1.58423 | v1 = 30.49 |
| r2 = 9.5869 (aspherical) | | | |
| | d2 = D1 (variable) | | |
| r3 = 4.0210 (aspherical) | | | |
| | d3 = 1.499 | n2 = 1.49241 | v2 = 57.66 |
| r4 = 4.5664 | | | |
| | d4 = D2 (variable) | | |
| r5 = 16.9462 (aspherical) | | | |
| | d5 = 3.250 | n3 = 1.49241 | v3 = 57.66 |
| r6 = −15.4663 | | | |
| | d6 = D3 (variable) | | |
| r7 = 18.9566 (aspherical) | | | |
| | d7 = 20.500 | n4 = 1.49241 | v4 = 57.66 |
| r8 = ∞ | | | |
| | d8 = 0.500 | | |
| r9 = 119.7271 | | | |
| | d9 = 21.000 | n5 = 1.49241 | v5 = 57.66 |
| r10 = ∞ | | | |
| | d10 = 1.999 | | |
| r11 = 18.7810 (aspherical) | | | |
| | d11 = 3.500 | n6 = 1.49241 | v6 = 57.66 |
| r12 = −21.7183 | | | |
| | d12 = 0.200 | | |
| r13 = 18.1996 | | | |
| | d13 = 2.000 | n7 = 1.49241 | v6 = 57.66 |
| r14 = 26.2175 | | | |
| | d14 = 15.989 | | |

-continued r15 = (eyepoint)

Aspherical coefficients

Second surface $P = 2.1117$, $E = -0.65588 \times 10^{-3}$,
$F = -0.57034 \times 10^{-5}$, $G = 0.33129 \times 10^{-6}$,
$H = -0.11289 \times 10^{-7}$ Third surface $P = 0.7615$, $E = -0.94324 \times 10^{-3}$,
$F = -0.91685 \times 10^{-5}$, $G = 0.22204 \times 10^{-5}$,
$H = -0.324 \times 10^{-6}$ Fifth surface $P = 3.9228$, $E = -0.12187 \times 10^{-3}$,
$F = -0.39160 \times 10^{-5}$, $G = 0.18493 \times 10^{-6}$,
$H = -0.34037 \times 10^{-8}$ Seventh surface $P = 0.4096$, $E = -0.28892 \times 10^{-4}$,
$F = -0.76300 \times 10^{-6}$, $G = 0.92888 \times 10^{-7}$,
$H = -0.37589 \times 10^{-8}$ Eleventh surface $P = 1.0000$, $E = -0.62557 \times 10^{-4}$,
$F = 0.19878 \times 10^{-6}$, $G = -0.60456 \times 10^{-8}$ Zoom data

| | Wide angle position | Middle position | Telephoto position |
|---|---|---|---|
| D1 | 9.2653 | 4.3636 | 3.1135 |
| D2 | 12.0428 | 11.5399 | 8.7054 |
| D3 | 0.9192 | 5.8828 | 9.7197 |

In each embodiment mentioned above, r1, r2, . . . represent radii of curvature of individual lens surfaces; d1, d2, . . . thicknesses of individual lenses or spaces therebetween; n1, n2, . . . refractive indices of individual lenses; and ν1, ν2, . . . Abbe's numbers of individual lenses.

Also, the configurations of aspherical surfaces in each embodiment are expressed by the following equation using the aspherical coefficients:

$$X = CS^2/[1+\sqrt{1-PC^2S^2}\,] + ES^4 + FS^6 + GS^8 + HS^{10}$$

where X represents the coordinates in the direction of the optical axis, S the coordinates In the direction normal to the optical axis, C the curvature (=1/r) at the vertex of the aspherical surface, P the conic constant, and E, F, G, and H the aspherical coefficients of fourth, sixth, eighth, and tenth orders.

Also, although in each embodiment the field frame 26 is such that its shape is changed when the mode of photography is converted, it may be designed so that a field frame different in shape is used each time the mode of photography is converted.

What is claimed is:

1. A finder optical system for a camera in which a photographing optical system and said finder optical system are arranged separate from each other, said finder optical system comprising in order from an object side:

an objective system having a positive refracting power;

a reflecting member;

a field frame variable in shape; and an eyepiece system having a positive refracting power, an eyepoint formed by said eyepiece system being positioned opposite to said eyepiece system, said eyepiece system including:

a first positive lens unit movable along an optical axis, and a second positive lens unit movable in and out of an optical path of said eyepiece system;

wherein said shape of said field frame varies in association with an operation of said second positive lens unit moving in and out of said optical path of said eyepiece system.

2. A finder optical system for a camera in which a photographing optical system and said finder optical system are arranged separate from each other, said finder optical system comprising in order from an object side:

an objective system having a positive refracting power;

a reflecting member;

a field frame variable in shape; and an eyepiece system having a positive refracting power, an eyepoint formed by said eyepiece system being positioned opposite to said eyepiece system, said eyepiece system including:

a positive lens movable along an optical axis, and a negative lens movable in and out of an optical path of said eyepiece system;

wherein said shape of said field frame varies in association with an operation of said negative lens moving in an out of said optical path of said eyepiece system.

3. A finder optical system according to claim 1, further comprising, in order from said object side, a second reflecting member after said field frame.

4. A finder optical system according to claim 2, further comprising, in order from said object side, a second reflecting member after said field frame.

5. A finder optical system according to any one of claims 1, 2, 3 or 4, wherein said objective system is movable along an optical axis thereof.

6. A finder optical system according to any one of claims 1, 2, 3 or 4, satisfying a condition $$4.5 < |f_I/f_L| < 8$$

where $f_I$ is a compound focal length of a lens unit of said eyepiece system inserted in said optical path when a focal length of said eyepiece system is changed, and $f_L$ is a compound focal length of a lens unit of said eyepiece system held in said optical path when a focal length of said eyepiece system is changed.

* * * * *